United States Patent [19]

Geiling et al.

[11] Patent Number: 4,821,850
[45] Date of Patent: Apr. 18, 1989

[54] DOUBLE-TUBE VIBRATION DAMPER

[75] Inventors: Wolfgang Geiling, Schonungen-Hausen; Felix Wössner, Schweinfurt, both of Fed. Rep. of Germany

[73] Assignee: Fichtel & Sachs AG, Schweinfurt, Fed. Rep. of Germany

[21] Appl. No.: 31,987

[22] Filed: Mar. 27, 1987

[30] Foreign Application Priority Data

Apr. 4, 1986 [DE] Fed. Rep. of Germany ....... 3611288

[51] Int. Cl.$^4$ ............................. F16F 9/06; F16F 9/36
[52] U.S. Cl. .................. 188/315; 188/322.18; 92/82; 137/312; 137/513.7
[58] Field of Search .................. 137/312, 513.3, 513.5, 137/513.7; 92/247, 82, 86; 188/281, 282, 315, 317, 322.15, 322.18

[56] References Cited

U.S. PATENT DOCUMENTS

| | | | |
|---|---|---|---|
| 2,206,110 | 7/1940 | Myers et al. | 188/315 |
| 2,723,006 | 11/1955 | Wyeth | 188/315 X |
| 3,338,257 | 8/1967 | Ferguson | 137/513.3 |
| 3,735,992 | 5/1973 | Prostorov et al. | 92/249 X |
| 4,166,522 | 9/1979 | Bourcier de Carbon | 188/317 X |

FOREIGN PATENT DOCUMENTS

| | | | |
|---|---|---|---|
| 0124858 | 8/1945 | Australia | 188/282 |
| 3008707 | 9/1981 | Fed. Rep. of Germany | |
| 7014224 | 4/1970 | France | |
| 2487031 | 1/1982 | France | 188/322.13 |
| 0022044 | of 1915 | United Kingdom | 188/322.13 |
| 2072797 | 10/1981 | United Kingdom | 188/322.13 |

Primary Examiner—Andres Kashnikow
Assistant Examiner—Timothy Newholm
Attorney, Agent, or Firm—Toren, McGeady

[57] ABSTRACT

For a double-tube vibration damper which comprises an axially proceeding groove in the cylinder for by-passing the piston valves, a piston is provided which possesses a satisfactory sealing and guidance function in the cylinder. This is achieved in that the piston comprises a rigid piston ring arranged in a piston groove and acting as sealing ring against the cylindrical surface, while the piston comprises a second piston ring groove for the reception of a guide ring consisting of a piston ferrule. In this case at least one relief passage is provided which connects the second piston ring groove and/or the space situated between the piston ring grooves with the working chamber remote from the piston rod.

13 Claims, 7 Drawing Sheets

DOUBLE-TUBE VIBRATION DAMPER

BACKGROUND OF THE INVENTION

The invention relates to a double-tube vibration damper.

In a vibration damper which is suitable to take up wheel guidance forces, that is to say is to take up radial forces, it is known (Fed. German Patent application No. 30 08 707) to arrange a piston ringe in an annular recess of the piston, the axial extent of the piston ring amounting to a multiple of the ring wall thickness. In order to achieve a good sealing effect and an exact guidance of the piston ring and thus of the piston in relation to the inner wall of the cylinder under all operating conditions, the piston ring is pressed, without radial play, with a relatively great pressing force against the inner wall of the cylinder. Accordingly the piston ring is subjected to high radial forces and must consist of a material favorable to slippping, in order to keep the friction resistance low.

Furthermore in vibration dampers it is known (French Pat. No. 2,088,644) to provide at least one substantially axially proceeding groove in the inner wall of the cylinder, for stroke-dependent damping force variation, which forms with the piston ring a by-pass cross-section for the working chambers separated by the piston. As a result of the high pressure differences between the working chambers occurring in double-tube vibration dampers, especially in the traction phase, the piston ring is to be made relatively rigid, so that it does not yield into the cylinder groove due to the high pressures building up in the piston ring groove. If the rigidity of the piston ring is inadequate the by-pass cross-section and thus also the required damping effect are modified in an undesired manner, and no unambiguous control edge is formed for the by-pass cross-section.

The present invention is directed towards provision of a double-tube vibration damper which is suitable for taking up wheel guidance forces, which forms an unambiguous control edge for the by-pass passage formed by an axial groove in the cylinder and which guarantees a satisfactory sealing effect between the working chambers and good guidance of the piston, with minimum friction, even when taking up wheel guidance forces.

SUMMARY OF THE INVENTION

The double-tube vibration damper in accordance with the invention has a piston with a second piston ring groove for the reception of a guide ring consisting of a piston ferrule, while at least one pressure relief passage is provided which connects the second piston ring groove, or the space situated between the piston ring grooves, with the working chamber remote from the piston rod. By arrangement of two piston rings an unambiguous separation of tasks is rendered possible, where the first rigid piston ring is arranged radially movably in the first piston ring groove and takes over only the sealing function while the guide ring situated in the second piston ring groove serves for the guidance of the piston in the cylinder and thus can be installed without substantial initial stress, so that a favorable, low-friction sliding of the piston in the cylinder is guaranteed. The relief passage achieves the object that no appreciable pressures can build up in the second piston ring groove, so that the guide ring can be produced from a relatively soft material, without being forced into the cylinder groove which forms the by-pass cross-section or passage. Moreover the relief passage provides an unambiguous control edge for the by-pass passage to the piston sealig ring, formed by the cylinder groove.

A very simple embodiment of the relief passage is provided according to one feature of the invention in that this passage is formed by at least one longitudinal slot arranged in the piston and bridging over the guide ring.

Further advantageous embodiments of the relief passage are obtained according to the invention in that this passage is formed by a plurality of axial passages distributed uniformly over the circumference and arranged in the guide ring. According to one example of embodiment the axial passages are defined by the guide ring and by the second piston ring groove, while in another form of embodiment the axial passages are defined by the guide ring and by the inner wall of the cylinder.

A very advantageous piston design is obtained in that according to one feature of the invention the relief passage consists of a gap formed by the ends of the piston ferrule constituting the guide ring. This piston embodiment becomes especially price-favorable since no precautions for the formation of the relief passage are necessary in the piston body.

In order to avoid a pressure build-up in the second piston ring groove, according to a further embodiment the relief passage is formed by a plurality of preferably radial relief bores distributed uniformly over the circumference of the second piston ring groove. In further development of the invention the relief passage comprises at least one collecting groove into which there lead passage openings leading to the working chamber remote from the piston rod. According to the invention these passage openings are formed by at least one axially extending passage connecting the collecting grooves with the working chamber remote from the piston rod. Of course these passage openings can also be formed by other measures, for example by bores.

As a result of the slight pressure differences through the relief passage, occurrig in the region of the guide ring, it is readily possible that the piston ferrule forming the guide ring should consist of a thin and elastic synthetic plastics material strip. Such a guide ring consisting of slip-favorable synthetic plastics material is very good value for money and permits simple fitting.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE DRAWINGS

Figure 1:
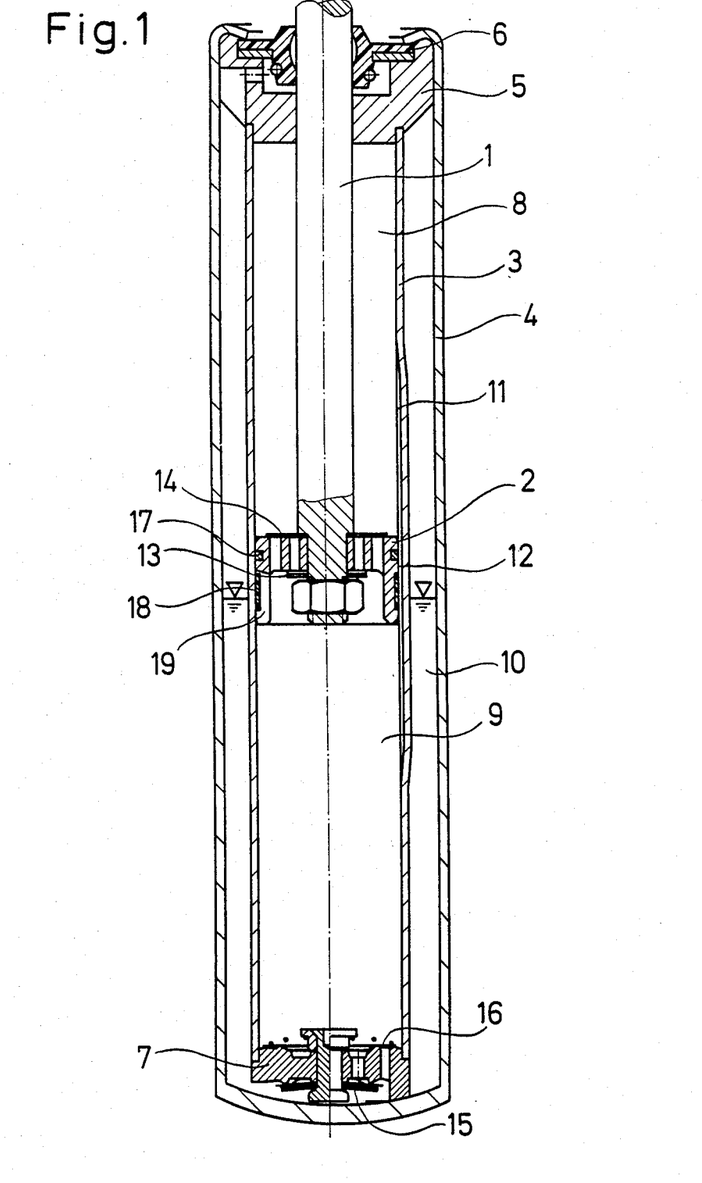
FIG. 1 shows a longitudinal section through a double-tube vibration damper.

The double-tube vibration damper as shown in FIG. 1 comprises a piston rod 1 which is connected with a piston 2 guided axially on the inner wall of a cylinder 3. The cylinder 3 is clamped concentrically in a container 4 by means of a piston rod guide 5 and a bottom valve member 7. The piston rod 1 is guided in the piston rod guide 5 and sealed off to the exterior by means of a piston rod seal 6. The damping-fluid-filled interior space of the cylinder 3 is divided by the piston 2 into an upper working chamber 8 close to the piston rod and a working chamber 9 remote from the piston rod 2. The working chamber 9 remote from the piston rod is in communication through the bottom valve member 7 with a compensating chamber 10, which contains damping fluid and a gas filling. A variation of damping force dependent upon the piston stroke is achieved by a substantially axially proceeding groove 11 in the cylinder 3 which, with a sealing ring 17 arranged in the piston 2, forms a by-pass passage 12. This by-pass passage 12 is arranged parallel with a traction-damping valve 13 and with a valve 14 of the piston 2 which responds in the compression stroke. It is readily possible for several such axially proceeding grooves to be arranged in the cylinder 3, and these may have different axial lengths. In the traction phase of the piston rod 1 the damping is determined essentially by the traction damping valve 13 of the piston 2 and by the by-pass passage 12. A non-return valve 16 situated in the bottom valve member 7 opens in the case of this direction of movement and renders possible a following flow of damping fluid out of the compensating chamber 10 into the working chamber 9, as a result of the volume of the piston rod 1 emerging from the cylinder 3. In the compression stroke, that is when the piston rod 1 is driving into the cylinder 3, the valve 14 in the piston 2 opens, the compression damping being effected essentially by a compression damping valve 15 situated in the bottom valve member 7.

Figure 2:
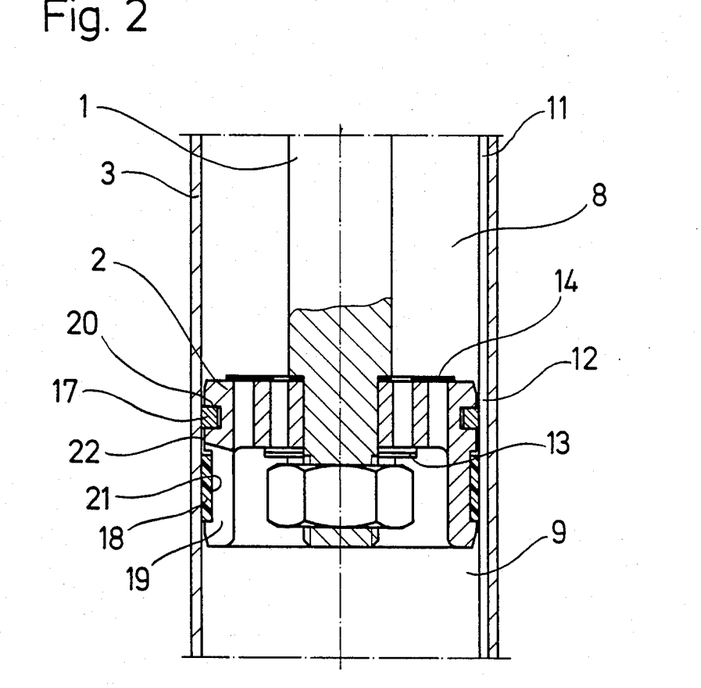
FIG. 2 shows the piston of the vibration damper according to FIG. 1 in enlarged representation.

The sealing ring 17 of the pston 2 connected with the piston rod 1 is relatively rigid and arranged radially movably in a first piston ring groove 20. For the guidance of the piston 2 in the cylinder 3 a second piston ring groove 21 is provided in which there is situated a guide ring 18 in the form of a piston ferrule. Especially in traction damping a relatively great pressure difference occurs between the working chambers 8 and 9, and also takes effect in the groove 11 and in the by-pass passage 12. In order to prevent a pressure building up in a space 22 situated between sealing ring 17 and guide ring 18 and thus also in the second piston ring groove 21, which pressure would press the guide ring 18 into the axially proceeding groove 11, at least one longitudinal slot 19 is provided in the piston 2, which opens for the one part into the chamber 22 and for the other into the working chamber 9 remote from the piston rod and bridges over the guide ring 18. This longitudinal slot 19 achieves a substantial pressure relief for the guide ring 18, so that the latter is not pressed into the axially proceeding groove 11. At the same time the object is achieved that the rigid sealing ring 17 forms an unambiguous control edge with the axially proceeding groove 11. Since the compression damping is generated essentially by the compression damping valve 15 situated in the bottom valve member 7 and the valve plate 14 of the piston 2, responding in the compression stroke, is effective predominantly as non-return valve, no appreciable differential pressures occur between the working chambers 8 and 9 in this phase of working, so that there is no danger of the guide ring 18 being pressed into the axially proceeding groove 11 of the cylinder 3.

Variants of the piston for the double-tube vibration damper according to FIGS. 1 and 2 will be described hereinafter. For the explanation the reference numerals of FIGS. 1 and 2 will be used and reference is made to the description of these Figures.

Figure 3:
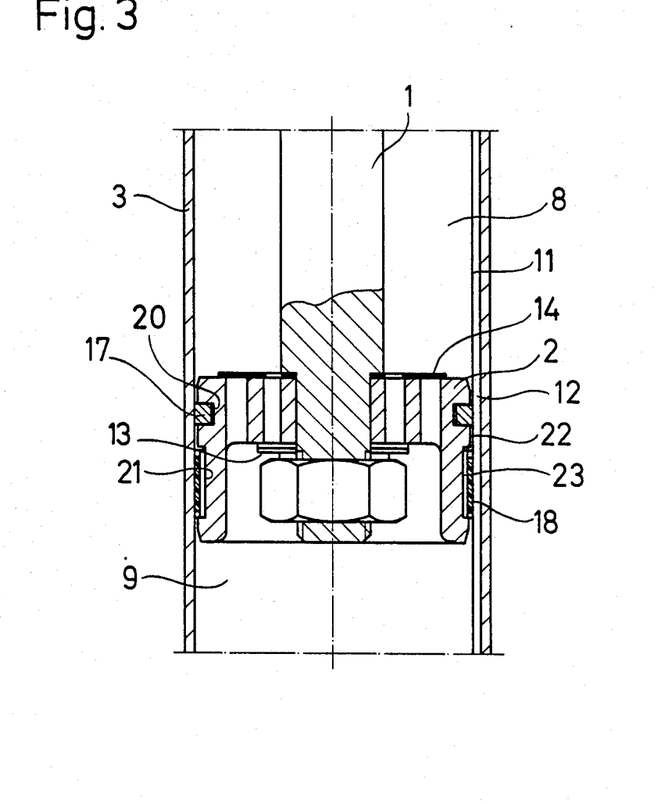
FIG. 3 shows a first variant of the piston in longitudinal section.

FIG. 3 shows an embodiment of the piston 2 in which the chamber or space 22 situated between sealing ring 17 and guide ring 18 is connected through a relief passage with the working chamber 9 remote from the piston rod. This relief passage consists of several axial passages 23 distributed uniformly over the circumference and arranged on the internal peripheral surface of the guide ring 18, which are defined by the guide ring 18 and the second piston ring groove 21. In this way the object is achieved that no higher pressure builds up between guide ring 18 and second piston ring groove 21 than in the working chamber 9 remote from the piston rod, that is the pressure prevailing in the by-pass passage 12 in traction damping is diminished both by way of the axially proceeding groove 11 and by way of the space 22 and the axial passages 23 to the working chamber 9 remote from the piston rod.

Figure 4:
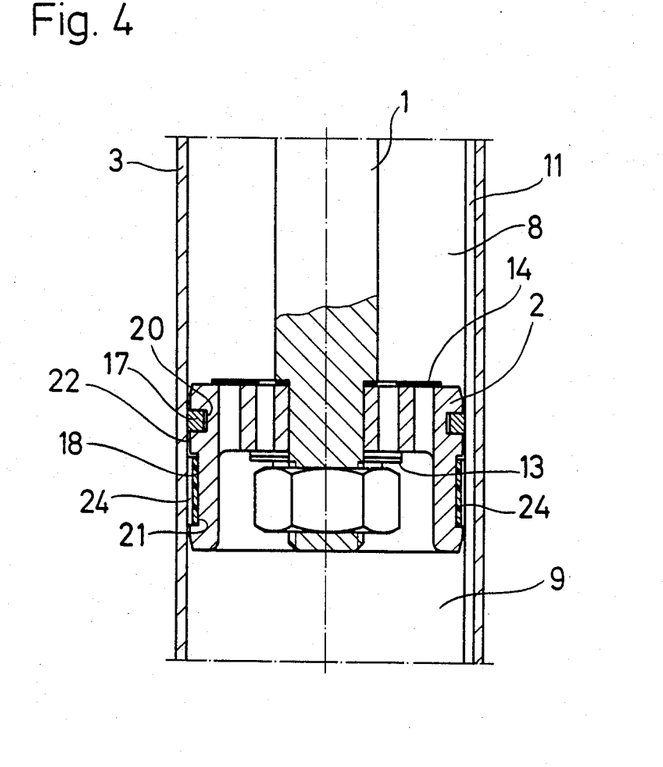
FIG. 4 shows a second variant of the piston, in which relief passages are formed by guide ring and inner wall of the cylinder.

The embodiment according to FIG. 4 differs from that according to FIG. 3 essentially in that the space 22 situated between sealing ring 17 and guide ring 18 is connected in pressure-relieving manner with the working chamber 9 remote from the piston rod 2 through radially outwardly lying axial passages 24 of the guide ring 18. In this case the axial passages 24 distributed regularly over the circumference of the guide ring 18 are defined by the guide ring 18 and by the inner wall of the cylinder 3.

Figure 5:
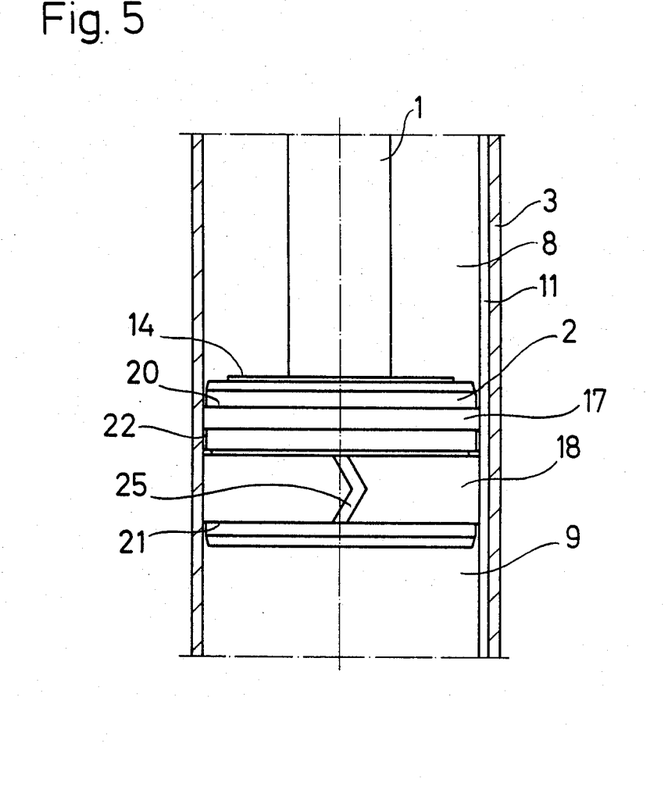
FIG. 5 shows a third variant of a piston in which the relief passage consists of a gap formed by the ends of a piston ferrule.

FIG. 5 shows an especially simple hydraulic relief of the guide ring 18, which is formed as an open ring. The relief passage for the space 22 situated between sealing ring 17 and guide ring 18 consists in this case of a gap 25 which is formed by the ends of the piston ferrule which constitutes the guide ring 18. Thus by way of this gap 25 the space 22 is in fluid-conductive communication with the working chamber 9 remote from the piston rod, for the pressure relief of the piston ferrule 18.

Figure 6:
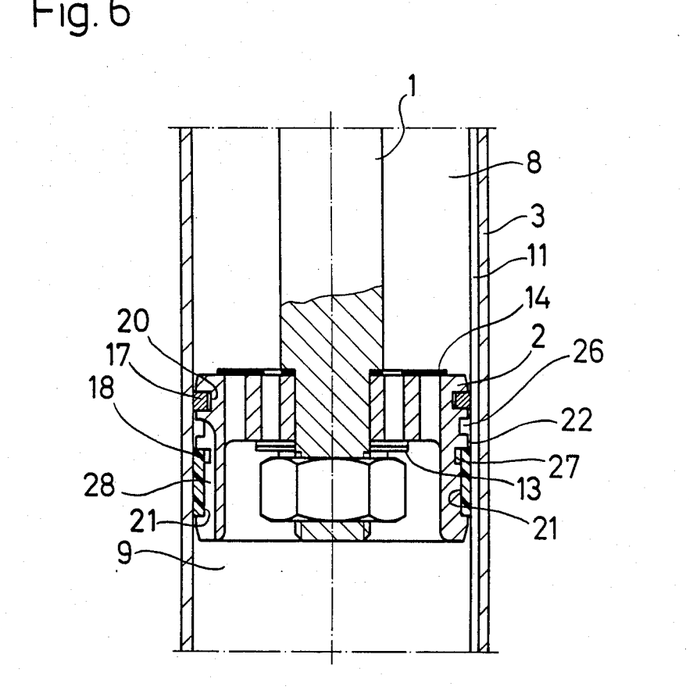
FIG. 6 shows a fourth variant of the piston, the relief passage of which is formed by collecting grooves and passage openings.

FIG. 6 shows a further embodiment of the piston 2. In this case a collecting groove 26 enlarging the space 22 is provided between sealing ring 17 and guide ring 18, while a further collecting groove 27 is arranged in the second piston ring groove 21 behind the guide ring 18. For the pressure relief of the guide ring 18 at least one axially extending passage 28 is provided in the piston 2, which connects the collecting grooves 26 and 27 in fluid-conductive manner with the working chamber 9 remote from the piston rod.

Figure 7:
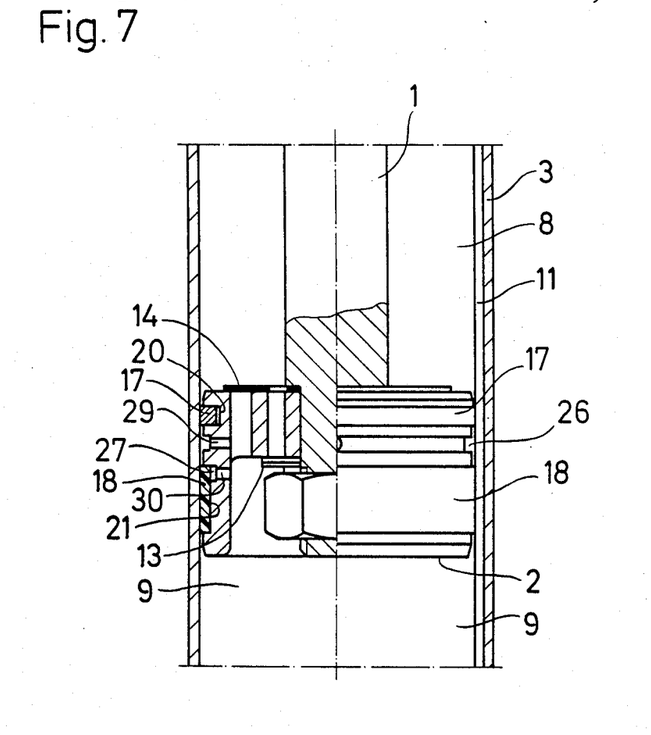
FIG. 7 shows a fifth variant of the piston, the collecting grooves of which are in communication through radial bores with the working chamber remote from the piston rod.

In the embodiment according to FIG. 7 the collecting groove 26 is in communication by way of radial bores 29 and the collecting groove 27 is in communication by way of radial bores 30 with the working chamber 9 remote from the piston rod. In this way again a pressure relief of the guide ring 18 is achieved.

As a result of the above-described measures for the pressure relief of the guide ring 18 it is readily possible to produce the latter from an elastic synthetic plastics material strip or strip-like ring which is thin in relation to its width and possesses good slipping properties.

In the examples of embodiment as described a separation of function of the piston rings arranged one behind the other is provided in each case, where the relatively rigid sealing ring 17 is for example a sintered metal ring, which lies radially movably in the first piston ring groove 20 and possesses only a sealing function, while the guide ring 18 guarantees a satisfactory supporting of the piston 2 in the cylinder 3 in taking up wheel guidance forces, without being pressed into the axial groove 11, serving as by-pass cross-section, of the cylinder 3.

While specific embodiments of the invention have been shown and described in detail to illustrate the application of the inventive principles, it will be understood that the invention may be embodied otherwise without departing from such principles.

What we claim is:

1. A double-tube vibration damper, comprising: a tubular, damping-fluid filled axially extending cylinder defined at one end by a bottom part and at the other end by a sealing part, a piston, displaceable in the cylinder located on a piston rod extending in sealed manner out of the cylinder through the sealing part, said piston dividing the cylinder into a first working chamber containing the piston rod and a second working chamber remote from the piston rod, a container laterally surrounding the cylinder with radial spacing and forming a compensating chamber filled with damaping fluid and gas, the compensating chamber of the container being in communication by way of a valve arrangement in the bottom part with the second working chamber, a damping device on the piston, rendering possible the passage of damping fluid through the piston, said piston having an axially and circumferentially extending outer surface facing and adjacent to the internal surface of the cylinder, a substantially rigid sealing ring seated in a first circumferential groove in the outer surface of the piston and sealing the piston against the internal surface of the cylinder, a substantially axially extending groove in the internal surface of the cylinder extending between the first and second working chambers, which groove together with the sealing ring forming a by-pass passage around said piston for stroke-dependently varying the damping force, a guide ring arranged in a second circumferential groove in the outer surface of the piston spaced axially from said first circumferential groove and located closer to the second working chamber than said first circumferential groove, said guide ring guiding the piston radially on the cylinder, said guide ring being formed of a flexible elastic plastics material means for low-friction sliding of said piston in said cylinder, and at least one generally axially extending pressure relief passage which connects at least one of the second circumferential groove and an annular space, positioned axially between the first and second circumferential grooves and defined by the internal surface of the cylinder and the outer surface of the piston, with the second working chamber remote from the piston rod.

2. A double-tube vibration damper according to claim 1, wherein the relief passage is formed as an axially attending slot of the piston which is open to the second circumferential groove.

3. A double-tube vibration damper according to claim 1, wherein the guide ring contains a plurality of axially extending grooves arranged with spacing from one another in the circumferential direction, for the formation of relief passages.

4. A double-tube vibration damper according to claim 3, wherein the axial grooves are arranged on the radially inner side of the guide ring.

5. A double-tube vibration damper according to claim 3, wherein the axial grooves are arranged on the radially outer side of the guide ring.

6. A double-tube vibration damper according to claim 1, wherein the guide ring is formed as an open ring of which the ends opposite to one another in the circumferential direction form a gap serving as the relief passage.

7. A double-tube vibration damper according to claim 1, wherein several circumferentially distributed bores forming the relief passages open into the second circumferential groove.

8. A double-tube vibration damper according to claim 1, wherein in the second circumferential groove or in the circumferential surface of the piston axially between the first and the second circumferential groove there is provided a further circumferential groove forming a collecting passage, which is connected by way of at least one connecting passage with the working chamber remote from the piston rod.

9. A double-tube vibration damper according to claim 8, wherein the connecting passage proceeds axially.

10. A double-tube vibration damper according to claim 8, wherein the connecting passage is formed as a radial hole connected with an axial opening of the piston.

11. A double-tube vibration damper according to claim 1, wherein at least one part of the relief passage has an axial course and connects the second circumferential groove with the annular space placed between the first and the second circumferential groove.

12. A double-tube vibration damper according to claim 1, wherein the guide ring is formed as a piston ferrule and is wider in the axial direction than the sealing ring.

13. A double-tube vibration damper according to claim 12, wherein the guide ring comprises of a synthetic plastics material strip which is thin in relation to its axial dimension.

* * * * *